ated Sept. 8, 1959

United States Patent Office

2,903,395

2,903,395

AQUEOUS CALCIUM DIOXYTETRACYCLINE ANTIBIOTIC COMPOSITION

Charles J. Salivar, Malverne, N.Y., assignor to Chas. Pfizer & Co., Inc., Brooklyn, N.Y., a corporation of Delaware No Drawing. Application March 30, 1956
Serial No. 575,004

7 Claims. (Cl. 167—65)

This invention is concerned with suspensions of the antibiotic oxytetracycline (available under the registered trademark Terramycin) and in particular with aqueous suspensions of the calcium salt of the antibiotic. This application is a continuation-in-part of copending application, Serial No. 446,150, filed July 27, 1954, now abandoned.

Antibiotics including the very active compound oxytetracycline have been prepared in a variety of dosage forms including suspensions, solutions, capsules, tablets, and so forth. These products have been shown to have value in the treatment of various specific infections including infections of animals as well as man. Oxytetracycline has been used in various of its known forms in these preparations. These forms include acid addition and metal salts in addition to the amphoteric material.

For some time, a need has existed for a stable aqueous suspension of oxytetracycline. For most therapeutic applications, the hydrochloride salt of oxytetracycline has been employed. However, this material is unsatisfactory for use in oral aqueous preparations because of its bitter taste and since the salt hydrolyzes in solution resulting in precipitation of the amphoteric material. The bitter taste of the hydrochloride salt has indeed proved difficult to mask in the production of palatable preparations. Suspensions prepared from the amphoteric antibiotic have also proven unsatisfactory. While a great improvement in the palatability can be obtained by employing the amphoteric material the biological and color stability of such preparations is unsatisfactory except for limited periods of time. The known metal salts of oxytetracycline have also proven unsatisfactory for the preparation of aqueous pharmaceutical formulations. The alkali metal salts for example, the sodium and potassium salts are water soluble and their aqueous solutions turn dark on standing. While aqueous solutions of the sodium and potassium salts retain their biological potency for three or four days at temperatures below 15°, their aqueous solutions are not sufficiently biologically or color stable for use in pharmaceutical formulations. A water soluble crystalline complex of oxytetracycline with calcium chloride which contains four molecules of oxytetracycline to one molecule of calcium chloride is known. However, when this material dissolves in water it dissociates yielding two molecules of amphoteric oxytetracycline which makes it unsatisfactory for aqueous formulations for the reasons outlined above for amphoteric oxytetracycline. The remaining known metal salts are amorphous materials which frequently are produced as gums and are very unsatisfactory to use in formulations since products of varying composition are obtained from one production run to the next. These salts include the barium-calcium salt, the barium-magnesium salt, and the calcium-magnesium salt. Of course, those mixed salts containing barium are not satisfactory for pharmaceutical formulations because of the toxicity of the barium.

The need for a stable and palatable aqueous suspension of the antibiotic is particularly great in the administration of oxytetracycline to infants and children. The need also exists in certain veterinary applications for a stable aqueous suspension of the antibiotic. For example, a specific type of infection which has given great concern to animal raisers, particularly in the dairy industry, is a condition known as bovine mastitis. Various types of antibiotic preparations have been advanced as useful in the treatment of this condition. These have included suspensions of antibiotics in various media such as oils, water, and various solutions. These preparations have been characterized by a tendency upon dilution with water or milk to form gummy or oleaginous masses which are poorly distributed throughout the locale of the disease. This has resulted in prolongation of the condition beyond the necessary time to effect cure.

In the administration of antibiotics to children and infants a number of problems are encountered. When the antibiotics are prepared in the form of tablets or capsules, it is virtually impossible to administer them to infants and very difficult to administer them to children because of the difficulty encountered in swallowing such an object. This problem has been met to a degree by pulverizing the tablets and mixing the material with the food or drink of the patient. However, such a procedure is generally undesirable since losses frequently occur as a result of inadequate mixing and rejection of the material by the child or infant. As was indicated above, it has not been possible to prepare satisfactory aqueous preparations of oxytetracycline from either the hydrochloride salt, the known metal salts, or the amphoteric material. A partial solution to the problem of pediatric administration of the antibiotic has been found in the provision of a product consisting of a dry mixture of the amphoteric antibiotic with various flavors and suspending agents which is reconstituted with water to form a suspension suitable for oral administration to the child. Such a preparation has the disadvantage of being unwieldy to prepare for administration. Furthermore, difficulty is sometimes encountered in resuspending the antibiotic prior to administration after it has been reconstituted, and local water supplies are sometimes unsuitable. Since antibiotic preparations of this type are almost always administered by laymen who may not appreciate the necessity of having a homogeneous suspension, the mixture may not be shaken sufficiently before use. This may result in the administration of insufficient drug when the bottle is first used and in an overdose when the bottom of the bottle is approached. An overdose of a potent antibiotic is obviously inadvisable in any case but especially so when the antibiotic is to be administered to a child or infant.

The above problems in both the pediatric and veterinary fields have been overcome to a very large extent by the valuable products of the present invention which comprise suspensions of a new salt of oxytetracycline, calcium dioxytetracycline, in various pharmaceutically acceptable aqueous vehicles. Calcium dioxytetracycline has the composition corresponding to one atom of calcium and two molecules of oxytetracycline. The preparation of this material is described in detail in Example I at the end of this disclosure.

The particular vehicle employed in various specific embodiments of this invention is tailored to the particular use for which the product is intended. For the oral suspensions of calcium dioxytetracycline, it is preferred to use a syrup solution as the vehicle. A concentrated sucrose solution is quite satisfactory as are similar solutions containing other sugars such as invert sugar or vehicles containing glycerol or glycols in addition to the sugar syrup. Sucrose syrups containing 40 to 67% of the sugar on a weight basis are preferred vehicles for the valuable oral suspensions of the present invention. In one specific embodiment of the invention, a vehicle composed of the following components on a weight basis was used: 80% sugar syrup No. 1; 10% invert sugar No. 5; and 10% glycerol. Sugar syrup No. 1 is a designation used by the American Sugar Refining Company for a 67% (weight basis) aqueous solution of sucrose. Invert sugar syrup No. 5 is a designation used by the same manufacturer for an aqueous solution containing on a weight basis about 5% sucrose and about 67% total invert sugar. Other pharmaceutically acceptable aqueous vehicles may of course be used. For example, concentrated aqueous solutions of sorbitol are satisfactory. A 70% aqueous solution (weight basis) of sorbitol which is commercially available (Sorbo, Atlas Powder Company) has been found to be applicable.

The sugar syrup and the sorbitol, particularly the former, are especially desirable for several reasons. Their sweet taste helps to mask the flavor of the antibiotic, and their relatively high viscosity and specific gravities aid in maintaining the particles in suspensions. Viscosities in the range of about 40–100 centipoises were found to be desirable for the oral preparations. As an adjunct, sweetening agents such as sodium cyclohexanesulfamate or saccharin may also be added.

In the veterinary formula for mastitis treatment, it is not necessary to consider taste and palatability. An aqueous solution containing certain thickening and wetting agents has therefore been found satisfactory. The wetting and thickening agents are necessary to obtain the suspending qualities achieved by the high viscosity and specific gravity of the syrup solutions in the oral preparation. With this preparation lower viscosities are preferred since better distribution of the antibiotic in the infected organ is obtained. Viscosities in the range 20 to 60 centipoises are preferred. It has been found that alkaline earth metal salts of certain polyuronic acid compounds are particularly useful for this purpose. Salts of the compound known as alginic acid, a material readily prepared from certain seaweeds, serves this purpose admirably. The sodium salt of alginic acid is commercially available. Various soluble alkaline earth metal salts of hydroxycarboxylic acids of low molecular weight and low toxicity serve very effectively to convert the available soluble sodium salt to suitable slightly soluble salts in situ. Calcium lactate in particular is highly useful for this purpose. The insoluble alkaline earth metal salt of alginic acid thus forms a protective colloid which helps to maintain the calcium dioxytetracycline in suspension. Wetting agents which possess some solubility in water and are pharmaceutically acceptable have been found useful in the mastitis formulations. Most useful among these are the polyoxyethylene derivatives of fatty acid esters of the anhydro sugar alcohols such as the hexitans. Commercially available products known as Tween (a trademark of the Atlas Powder Company) are particularly useful. These materials are polyoxyethylene derivatives of fatty acid partial esters of polyolanhydrides such as the sorbitans.

It is desirable to use a rather high proportion of the thickening agent in this embodiment of the invention. Thus a proportion of from about 0.5 g. to about 2 g. of sodium alginate per gram of calcium dioxytetracycline is quite suitable. If the insoluble alginate is formed in situ, the hydroxy carboxylic acid alkaline earth metal salt used should then be present in sufficient quantity to assure substantial conversion of the alginate to the alkaline earth salt. The soluble alkaline earth hydroxycarboxylic acid salt exerts a buffering action and thus assists in control of the pH of the suspension both in its original form and after administration to an animal. If calcium lactate is used as the agent, a proportion of from about 0.1 to about 0.5 g. of the compound per gram of calcium oxytetracycline is suitable. Other salts such as magnesium lactate, calcium tartrate, etc. may be used.

The wetting agent, for example a Tween which is used in the present mastitis embodiments, should be present to the extent of about 0.05 to about 0.3 g. per gram of the calcium dioxytetracycline. This proportion may be adjusted as changes are made in the other materials of the composition in order to assure a suspension which will tend to remain in its original state under various conditions of storage and use and is resuspended with ease. In general, a proportion of water which is from approximately 15 to 50 times the weight of the calcium dioxytetracycline used is employed for these suspensions. Variations in the proportion of water will naturally alter the viscosity and ease of administration of the suspensions. However, this range in proportions has been found quite satisfactory. Alterations of the other materials will also affect the characteristics of the suspensions. Specific compositions which have been found highly suitable for the present use are described in detail hereinafter.

The mastitis suspensions may be rendered even more useful and effective against a wide variety of microorganisms by including in the composition the antibiotic polymyxin in addition to calcium dioxytetracycline. Polymyxin, which is commercially available as the sulfate, exercises a synergistic activity against many microorganisms when combined with oxytetracycline. Compositions of oxytetracycline and polymyxin are described and claimed in copending application of Arthur R. English and Jasper H. Kane, filed August 12, 1955, under Serial No. 303,998, now Patent No. 2,813,820. In general, it has been found that the polymyxin need be present in a minor proportion as compared to the oxytetracycline in order to exert the most favorable effect. For instance, proportions of from about 1 to about 3 g. of polymyxin sulfate for each 25 g. of calcium dioxytetracycline in the composition are useful proportions.

A variety of flavoring and taste masking substances may be employed in the compositions of this invention which are intended for oral administration to human patients. These include chocolate, cocoa, coffee, fruit flavor, wild cherry, banana, peach, raspberry, oil of peppermint, oil of spearmint, oil of orange, and various fruit acids such as citric acid, ascorbic acid, tartaric acid and the like. The peach flavor and the banana flavor have been found to yield particularly palatable products. Various dyes which have been accepted for medicinal products can be employed to impart a color to the composition which is consistent with the flavor. These include D. & C. yellow No. 10, D. & C. red No. 28, carmine solution (National Formulary, ninth edition, 1950), F.D. & C. yellow No. 5, F.D. & C. red No. 1 and F.D. & C. red No. 2.

It is desirable to incorporate a preservative into the valuable compositions of the present invention to prevent the growth of microorganisms which are not sensitive to the antibiotics contained therein. Molds are particularly troublesome if preservatives are not employed. A variety of preservatives known in the art for this type of use may be employed including calcium and sodium propionate, cinnamaldehyde, sorbic acid, and lower alkyl esters of parahydroxybenzoic acid (known in the art as parabens) and quaternary ammonium type preservatives such as benzalkonium chloride and the like. Anti-oxidants such as sodium bisulfite and sodium metabisulfite are also useful additives. A minor proportion of preservative and anti-oxidant, generally not more than about 15% by weight of the antibiotic, is employed. Preferred materials of these types include the parabens, sodium bisulfite, and sodium metabisulfite.

The improved antibiotic compositions of the present invention may be prepared containing calcium dioxytetracycline in various concentrations. For example, oral formulations useful in administration to infants where it is desirable to give a dose consisting of only a few drops, a concentrated suspension is preferred. With children and adults where the suspension can be administered by teaspoon, a somewhat more dilute product is desirable. It has been found that oral suspensions containing from about 25 to 100 mg. of calcium dioxytetracycline per milliliter of suspension are suitable. A convenient veterinary formula for use in mastitis contains about 30 mg. of calcium dioxytetracycline per milliliter.

In manufacturing the valuable compositions of the present invention, somewhat different techniques are required in preparing the various embodiments thereof. For example, in preparing the oral suspensions all of the solids are reduced to a particle size of less than about 100 microns. The solids except for the dyes are then thoroughly blended in a twin shell blender, milled until the individual particle diameter is within the above limits, screened and reblended. The blend is then suspended in the vehicle, the dyes and flavors added and the mixture passed through a mechanical homogenizer before bottling. The moist (water) calcium dioxytetracycline filter cake from the manufacturing operation can be advantageously used without drying in preparing the valuable formulations of the present invention.

In the case of the mastitis formula, a particular order of addition of materials favors the preparation of a smoothly and easily administered suspension. The vehicle for the antibiotics first prepared by gradually adding the soluble alginate to an aqueous solution containing the required amount of soluble non-toxic alkaline earth metal salt e.g. calcium lactate. The mixture is agitated during the process to form a uniform suspension of the slightly soluble alginate. The wetting agent, e.g., polysorbate 80 is added to the mixture with vigorous stirring to assure uniform distribution. Stabilizing agents such as sodium bisulfite are then added and the vehicle passed through an apparatus to assure a uniform mixture of suitable viscosity. For instance, the material may be passed through a homogenizer such as the "hydropulse" type to assure a viscosity in the range of from about 20 to about 60 centistokes. The antibiotic (or mixture of antibiotics if polymyxin is also to be used) and sterility-maintaining agent are mixed to obtain a homogeneous dry product. A small amount of the vehicle described above is added to the dry mixture, the mixture agitated to obtain a uniform texture, and the remainder of the vehicle gradually stirred into the suspension of antibiotic. The entire mixture is then passed through a homogenizer to obtain a uniform, readily administered product.

For bovine mastitis treatment, the above formulation may be most conveniently packaged in small wax-lined tin tubes. The tin tubes are capped and sealed. Administration of the product may be most readily made by fitting to the threaded top of the tin tube a long tubular device of plastic or metal adapted for administration of the materials to animals infected with mastitis. The material is very effective in spreading uniformly throughout an infected organ when properly administered bringing about remission in a minimum of time. In general that amount of suspension containing about 0.5 to about 2.0 grams of calcium dioxytetracycline is a suitable dosage for an infected cow. Multi-dose tubes of the preparation may be manufactured for use in treatment of a herd. For smaller animals a proportionately smaller dosage is generally employed.

The superior stability of the calcium dioxytetracycline aqueous suspension of the present invention to that of a similar preparation prepared from amphoteric oxytetracycline was apparent from parallel storage tests at different temperatures employing both types of preparation. A raspberry flavored aqueous suspension of amphoteric oxytetracycline in a 40% aqueous sucrose vehicle (weight basis) maintained its biological potency for approximately ten weeks at room temperature. However, when the temperature was increased to 37° C. and 50° C., drastic losses in potency were observed. Two weeks in the latter case and four to six weeks in the former case were the approximate maximum periods that potency was retained. Quite different results were obtained employing a banana flavored suspension of calcium dioxytetracycline in the same vehicle. In addition to maintaining its biological potency at room temperature virtually no loss in potency was observed at 50° C. for six weeks, and the actual upper limit of temperature stability was not determined. The color of the suspension, which was yellow due to the inherent color of the calcium dioxytetracycline salt, was completely stable at temperatures up to 37° C. for six weeks but did darken to a green or brown at higher temperatures.

The efficacy of the product was demonstrated by administering it to a number of adult humans. A suspension having a concentration of calcium dioxytetracycline of approximately 25 mg./ml. was employed. A dose corresponding to 250 mg. of the antibiotic was administered to each patient at the outset and after six hours. Blood samples were removed at intervals of one, two, four, six, nine and twelve hours and assayed for their oxytetracycline concentration by a standard microbiological assay. Blood levels with this preparation of the order of 1 mcg./ml. were obtained. Similar but somewhat lower blood levels were observed when a suspension of amphoteric oxytetracycline was employed.

The *K. pneumoniae* turbidimetric assay was employed in the biological stability tests. A nutrient medium was prepared and inoculated with the test organism. This medium was then mixed with a series of dilutions of an oxytetracycline solution of known concentration. This series of tubes served as standard. Dilutions of the test samples were then prepared in a similar fashion and mixed with the inoculated nutrient. The tubes were then inoculated for a standard period of time and the turbidities measured with a photometer. The assay was calculated by comparing a test sample dilution and one of the standards having the same turbidity. For the blood level work a *B. cereus* var. *mycoides* plate assay was employed. This was carried out in an analogous fashion employing agar plates incubated with the test organism. A reservoir, either a filter paper disc or a small cylinder, was provided at the center of each plate and supplied with various dilutions of standard and test antibiotic solutions. The diameter of the zone of inhibition following incubation was then a measure of the antibiotic potency.

The following examples are given to illustrate specific examples of the above invention and are not intended to limit the scope thereof in any way.

EXAMPLE I

The salt calcium dioxytetracycline was prepared as follows: oxytetracycline hydrochloride, 2.0 g., and 0.48 g. of calcium chloride were dissolved in 250 ml. of water. The pH was then adjusted to 5.5 with 10% sodium hydroxide and the solution set aside to permit crystallization. Crystallization commenced within twenty minutes at room temperature. In some runs one hour was required. When crystallization commenced the pH dropped to about 5 to 5.1. Additional 10% sodium hydroxide solution was then added to maintain the pH in the range of 5.5 to 6.0. When crystallization was complete, the pH was adjusted to 7–7.5 and the mixture kept at room temperature for 15 to 30 minutes to permit completion of crystallization. The product was collected on a filter, washed with water, and dried in vacuo at 50° C. for 24 hours. The calcium dioxytetracycline obtained by this procedure was found to have a bio-assay by the *Klebsiella pneumoniae* turbidimetric procedure of 895 mcg./ml.

A composition was prepared containing the following materials: calcium dioxytetracycline as prepared above, 1.968 g. (this material had a bio-potency of 800 mcg./mg.); sodium metabisulfite, 0.059 g.; sodium cyclohexanesulfamate, 0.050 g.; methyl parahydroxybenzoate, 0.054 g.; propyl parahydroxybenzoate, 0.006 g.; D. & C. yellow No. 10 (Kohnstamm), 0.06 g.; polysorbate 80 (Tween 80), 0.059 ml.; passion fruit flavor 27 (Polak), 0.1 ml.;

and 60 ml. of a vehicle composed of 80% sugar syrup No. 1, 10% total invert No. 5 and 10% glycerine. All of the solids except the calcium dioxytetracycline were first blended together in a twin shell blender and then pulverized until they passed a 0.01 inch screen and then reblended. The vehicle was prepared and one-fifth of it was saved for later dilution of the batch to volume. The solids were then added to the vehicle with rapid stirring followed by the flavor. The calcium dioxytetracycline which had been pulverized as above was then added with rapid stirring and the remaining vehicle added to volume. The calcium dioxytetracycline can also be conveniently added as the water wet filter cake. The mixture was then passed through a mechanical homogenizer and the pH adjusted to 7.5. A 30% sodium hydroxide (weight volume) solution or a 60% solution of citric acid on a weight basis was employed in the pH adjustment. The suspension was then saturated with nitrogen gas and subdivided.

A similar composition employing a 70% aqueous solution of sorbitol (Sorbo, Atlas Powder Company), was also prepared. A further variation of the above formulation that was prepared included the substitution of imitation peach flavor (Fritzche) for the fruit flavor and D. & C. red No. 28, 0.008 g. for the above dye in a third formulation.

EXAMPLE II

A composition similar to that of Example I was prepared except that the following dyes and flavors were employed; D. & C. red No. 28, 0.30 g.; carmine solution prepared according to the procedure in the ninth addition of the National Formulary 1950, 0.50 ml.; and imitation wild cherry (Dodge and Olcott), 0.10 ml.

EXAMPLE III

A suspension of calcium dioxytetracycline containing the following materials in 60 ml. of water was prepared as described in Example I. Sucrose 40 g., carboxymethyl cellulose, 0.1 g., methyl parahydroxybenzoate, 0.054 g., propyl parahydroxybenzoate, 0.06 g., calcium dioxytetracycline (assay 785 mcg./mg.), 3.9 g., banana flavor, 0.1 g. This sample was sub-divided into 3 different lots one of which was stored at room temperature (25° C.) another at 37° C. and a third at 50° C. Observations of the color and bio-potency were made at intervals of two, four and six weeks. All maintained their bio-potency at substantially the 100% level for the full period of the experiment. The sample stored at 50° C. had turned a yellow green color as opposed to the yellow color of the original material and those stored at 25 and 37° C.

EXAMPLE IV

A formulation was prepared comprising an aqueous suspension of calcium dioxytetracycline employing the following materials: calcium dioxytetracycline, 62.9; sodium ascorbate, 10 g.; imitation Jamaica banana (W. J. Bush) 1.5 g.; methyl parahydroxybenzoate, 0.9 g.; propyl parahydroxybenzoate, 0.1 g.; F. D. & C. yellow No. 5 (H. Kohnstamm), 0.1 g.; and sufficient 77% sucrose solution (weight volume) to make 1 l. of product. In preparation of this suspension it was important to use only salcium dioxytetracycline which was light yellow in color. Good results were obtained when the moist filter cake directly from the manufacturing operation was employed. The antibiotic salt, the parahydroxybenzoate preservatives, the sodium ascorbate, and the dye were blended in a suitable mechanical blender. The solid blend was then mixed with about one-fifth the required amount of vehicle and the flavor added. This was then blended for one hour in suitable agitating equipment and the remainder of the vehicle added. The mixture was further blended and sub-divided. The average potency of this suspension was 51 mg./ml. of oxytetracycline.

EXAMPLE V

Calcium lactate U.S.P., 9.14 g., was dissolved in 924.6 grams of sterile distilled water. Commercial sodium alginate (available under the name Kelgin XL) 20.6 g., was slowly added to the agitated solution of calcium lactate. Polysorbate 80 (Tween 80), 5.15 g., was added to the mixture which was thoroughly stirred to disperse it throughout the mass. Sodium bisulfite, 2.1 g., was added and the mixture passed through a homogenizer until the viscosity was within the range of from 20 to 60 centipoises. Crystalline calcium dioxytetracycline, 34.5 g., 1.5 grams of polymyxin B sulfate, 2.0 grams of methyl parahydroxybenzoate, and 0.5 gram of propyl hydroxybenzoate were thoroughly mixed in dry state until a uniform blend was obtained. A small quantity of the solution prepared above was added to the dry mixture and the mass was stirred until a paste was obtained. The remainder of the solution was added to the paste while continually stirring to disperse the solids throughout the mass. The suspension was then passed through a homogenizer twice with pressure of 2500 lbs. per square inch. The homogeneous mixture was packaged in wax-lined tin tubes which were sealed for use. It was found that the use of 15 ml. of this composition for the treatment of the infected udder of a cow suffering from mastitis was quite effective in bringing about a rapid and complete alleviation of the condition.

EXAMPLE VI

The blood levels of oxyteteracycline obtainable with or oral suspension of calcium dioxytetracycline were compared with those obtained using an aqueous suspension of amphoteric oxytetracycline. Two separate formulations were prepared using the following formulae:

| Formula: | G. |
|---|---|
| Calcium dioxytetracycline | 1.913 |
| Sodium cyclohexanesulfamate | 0.05 |
| Methyl p-hydroxybenzoate | 0.054 |
| Propyl p-hydroxybenzoate | 0.006 |

Vehicle to yield 60 ml. of suspension. The vehicle consisted, on a weight basis, of 10% invert sugar No. 5 of the American Sugar Refining Company and 90% sugar syrup No. 1 of the same manufacturer.

Formula 2:
| | |
|---|---|
| Amphoteric oxytetracycline _____g__ | 1.660 |
| Sodium cyclohexanesulfamate _____g__ | 0.05 |
| Methyl p-hydroxybenzoate _____g__ | 0.054 |
| Propyl p-hydroxybenzoate _____g__ | 0.006 |
| Raspberry flavor (Dodge and Olcott No. 5250) _____ml__ | 0.140 |
| F.D. & C. Red No. 2 _____g__ | 0.60 |
| F.D. & C. Red No. 1 _____g__ | 0.01 |

Vehicle to yield 60 milliliters of suspension. The vehicle employed was an 82.2% sucrose solution, weight volume basis, which had been adjusted to pH 3.5 with citric acid.

Each of the above suspensions had a concentration of approximately 125 mg./ml. of the antibiotic ingredient. Twenty adult human volunteers were selected and divided into two groups of ten volunteers each. To the first group was administered two teaspoonsful of calcium dioxytetracycline suspension corresponding to 250 mg. of the antibiotic at the outset. Blood samples were removed after one hour, two hours, four hours, six hours, nine hours, and twelve hours, and assayed for oxytetracycline activity by the B. cereus var. mycoides plate assay. The second group of volunteers was given a similar dose of the amphoteric oxytetracycline suspension and blood samples were removed in the same fashion and assayed for oxytetracycline activity. The average blood levels obtained for each group at the various time intervals are tabulated below.

*Average blood level of oxytetracycline activity (meg./ml.)*

| Suspension | 1 hr. | 2 hrs. | 4 hrs. | 6 hrs. | 9 hrs. | 12 hrs. |
|---|---|---|---|---|---|---|
| Calcium Dioxytetracycline | 1.28 | 1.12 | 0.843 | 0.669 | 1.34 | 1.11 |
| Amphoteric Oxytetracycline | 0.893 | 0.970 | 0.634 | 0.484 | 0.998 | 0.713 |

What is claimed is:

1. A therapeutic composition comprising calcium dioxytetracycline and a pharmaceutically acceptable aqueous vehicle therefor.
2. A therapeutic composition as claimed in claim 1 wherein the vehicle is a concentrated aqueous sugar solution.
3. A therapeutic composition as claimed in claim 1 wherein the vehicle is a concentrated aqueous sorbitol solution.
4. A therapeutic composition as claimed in claim 1 wherein the vehicle is an aqeuous solution of a non-toxic alkaline earth metal alginate and a pharmaceutically acceptable wetting agent.
5. A therapeutic composition as claimed in claim 4 wherein the alkaline earth metal alginate is formed in situ from a non-toxic water soluble alginate and a non-toxic alkaline earth metal salt of a hydroxycarboxylic acid.
6. A therapeutic composition comprising calcium dioxytetracycline and a pharmaceutically acceptable aqueous vehicle therefor wherein the calcium dioxytetracycline in finely divided form is suspended in an aqueous medium prepared from calcium lactate, sodium alginate, and a polyoxyethylene derivative of a fatty acid ester of a sorbitan.
7. A composition as claimed in claim 6 which contains polymyxin.

References Cited in the file of this patent

UNITED STATES PATENTS

| 2,376,656 | Buchanan | May 22, 1945 |
| 2,472,640 | Wilcox | June 7, 1949 |
| 2,498,374 | Martin | Feb. 21, 1950 |
| 2,619,447 | Malcolm | Nov. 25, 1952 |
| 2,637,679 | Gaunt | May 5, 1953 |
| 2,671,750 | Macek | Mar. 9, 1954 |
| 2,763,681 | Starbird | Sept. 18, 1956 |

FOREIGN PATENTS

| 658,467 | Great Britain | Oct. 10, 1951 |
| 507,692 | Belgium | June 9, 1952 |

OTHER REFERENCES

Anderson: J. Invest. Dermat., January 1947, pp. 25–33, esp. p. 27.

Seiden: Mfg. Chem., February 1953, pp. 63 and 64.

Neter et al.: "Synergistic Effects . . .," J. Urology, May 1952, pp. 773–775.